US000001897H

United States Statutory Invention Registration [19]

[11] Reg. Number: H1,897

Fletcher et al.

[45] Published: Oct. 3, 2000

[54] MERGED OPERATIONS AND MAINTENANCE CENTER AND METHOD FOR OPERATION

[75] Inventors: Anthony G. Fletcher; Scott D. Hoffpauir, both of Collierville; Kevin E. Yancy, Cordova, all of Tenn.

[73] Assignee: DSC/Celcore, Inc., Plano, Tex.

[21] Appl. No.: 09/026,809

[22] Filed: Feb. 19, 1998

Related U.S. Application Data

[60] Provisional application No. 60/060,107, Sep. 26, 1997.

[51] Int. Cl.[7] ..... H04Q 7/20

[52] U.S. Cl. ..... 455/433

[56] References Cited

U.S. PATENT DOCUMENTS

| | | | |
|---|---|---|---|
| 5,487,101 | 1/1996 | Fletcher | 379/60 |
| 5,521,961 | 5/1996 | Fletcher et al. | 379/59 |
| 5,623,532 | 4/1997 | Houde et al. | 379/58 |
| 5,627,881 | 5/1997 | Fletcher | 379/60 |

OTHER PUBLICATIONS

"*GlobalHub Mobility Manager—Enables "One Number" PCS Service Via Motorola PPS Residential Products*" pp. 1–2, Celcore, Inc., Memphis, Tennessee. 1996.

"*IS–41 Network Hub—The Mobility Manager for Celcore's GlobalSystem*" pp. 1–2, Celcore, Inc., Memphis, Tennessee. 1996.

"GlobalHub" pp. 1–10, Celcore, Inc., Memphis, Tennessee. 1996.

John Scourias, "*Overview of the Global System for Mobile Communications*", Mar. 27, 1996, pp. 1–16, John Scourias.

Martin A. Iroff & Steve Chen, "*A distributed GSM Architecture for Low–Traffic Density Markets*", *Mobile Communications International*, Oct. 1996, pp. 1–3, IBC Business Publishing, London, England.

Information pamphlet, Feb. 1997, pp. 1–7, Version 1.0 Celcore, Inc., Memphis, Tennessee.

"*BS–20/BS–21, D900/D1800 Base Transceiver Station*", pp. 1–2, Geschaftszweig Mobilfunknetze, Munchen, Germany. 1997.

"*ICs for Communications—Memory Time Switch Large MTSL*" Mar. 1995, pp. 1–15, Version 2.1, Siemens AG, Munchen, Germany.

"*ICs for Communication—Multipoint Switching and Conferencing Unit—Attenuation MUSAC–A*" Feb. 1996, pp. 1–68, Version 1.2, Siemens AG, Munchen, Germany.

(List continued on next page.)

*Primary Examiner*—Daniel T. Pihulic

*Attorney, Agent, or Firm*—John G. Flaim; Baker & McKenzie

[57] ABSTRACT

In one aspect of the present invention, a merged operations and maintenance center (200) is provided that performs radio and switch operations and maintenance functions for a telecommunications system such as an integrated wireless telecommunications system (14). The merged operations and maintenance center (200) may be in communication with a call processor (40) and includes a plurality of servers and a graphical user interface. The plurality of servers may include a configuration management server (72) for performing configuration management, a fault management server (74) for performing fault management, and an accounting management server (78) for performing accounting management. The graphical user interface may be implemented using any available interface.

25 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OTHER PUBLICATIONS

"*ICs for Communications—Multichannel Network Interface Controller for HDLC MUNICH32*" Jan. 1996, pp. 1–252, Version 3.2, Siemens AG, Munchen, Germany.

"*Unique Solutions to Complex Challenges of Wireless Carriers*" pp. 1–9, Celcore, Inc., Memphis, Tennessee. 1997.

Michel Mouly and Marie–Bernadette Pautet "*The GSM System for Mobile Communications*", 1992, pp. 79–122, pp. 261–646, Cell & Sys, France.

George Lamb "GSM made Simple", 1997, pp. 3–158, Regal Printing, United States of America.

Lawrence Harte, Stever Prokup, and Richard Levine "*Cellular and PCS, The Big Picture*", 1997, pp. 61–181, McGraw–Hill, United States of America.

MERGED OPERATIONS AND MAINTENANCE CENTER AND METHOD FOR OPERATION

CLAIM OF PRIORITY

This application claims priority from U.S. provisional patent application Ser. No. 60/060,107, entitled Cellular Communication System by Anthony G. Fletcher and Scott D. Hoffpauir as inventors, and filed on Sep. 26, 1997.

RELATED APPLICATIONS

This application is related to the following co-pending U.S. patent applications: Ser. No. 09/026,487 entitled *Network Management System Server and Method for Operation*, (DSC Docket No. 833-00; Baker & McKenzie Docket No. 24194000.179) filed concurrently on Feb. 19, 1998.

TECHNICAL FIELD OF THE INVENTION

This invention relates in general to the field of telecommunications and more particularly to a merged operations and maintenance center and method for operation.

BACKGROUND OF THE INVENTION

Wireless telecommunications systems utilize any of a variety of technologies and standards such as, for example, Global System for Mobile Communications (GSM); Code Division Multiple Access (CDMA); Time Division Multiple Access (TDMA); Frequency Division Multiple Access (FDMA); Personal Communications Service (PCS); and Advanced Mobile Phone Service (AMPS). Wireless telecommunications systems, both digital and analog, are composed of several distinct pieces of equipment and processors that are interconnected, each to carry out dedicated functions. The costs and complexity associated with the manufacture, maintenance and interface of such distinct equipment are relatively high.

The difficulties associated with interfacing distinct equipment can be illustrated with a GSM wireless telecommunications system. GSM has become the standard digital cellular phone service throughout Europe, Japan, Australia and elsewhere and is defined in specifications provided by the European Telecommunications Standards Institute (ETSI). The GSM specifications define discrete functionalities that carry out dedicated functions. These discrete functionalities have been implemented using discrete equipment that must be interfaced.

GSM wireless telecommunications systems may be separated into various subsections such as, among others, a Network Subsystem (NSS), a Base Station Subsystem (BSS) and an Operations and Maintenance Center (OMC). These subsections include various components such as, for example, the following: (a) a Base Station Controller (BSC); (b) a Base Transceiver Station (BTS); (c) a Mobile Switching Center (MSC); (d) a Visitor Location Register (VLR); (e) a Home Location Register (HLR); (f) an Authentication Center (AuC); (g) an Operations and Maintenance Center-Radio (OMC-R); and (h) an Operations and Maintenance Center-Switching (OMC-S). The implementation of these components as discrete equipment and processors is cumbersome, complex and expensive.

In particular, the GSM specifications define various Operations and Maintenance Centers (OMCs) that are specifically assigned to monitor and manage one part of a GSM wireless telecommunications system. Each such OMC includes dedicated computer hardware and software. For example, two such OMCs are the OMC-R and the OMC-S. The OMC-R is a stand-alone sub-system that interfaces with the BSC. The OMC-R manages and monitors the functions and operations of the BSS that include the BSC and the associated BTSs. The OMC-R includes a user interface and is provided as a stand-alone computer workstation. Generally, the OMC-R will be manufactured by the same company that manufactures the BSC and the BTSs that it manages and monitors.

The OMC-S is a separate, dedicated stand-alone workstation that manages and monitors the GSM wireless telecommunications switch that may include the MSC, the VLR, the HLR and the AuC. The OMC-S may receive, display and log event alarms and system status/operational information that is critical to the operation of the system. The OMC-S may also be used to control, start and shut down certain equipment. Generally, just as with the OMC-R, the OMC-S will also be manufactured by the same company that manufactures the associated equipment it manages and monitors. In addition to its network operations and maintenance functions, the OMC-S may also interface with a subscription management system to access and modify subscriber information stored in the subscriber database of the HLR. For example, the subscription management system may be used to update a subscriber's information stored in the HLR, to add new subscribers, including an associated Authentication Key (Ki) for a new subscriber and to change the services and features available to the subscriber. The OMC-S may also receive and store operational statistics related to call processing that may then be used for accounting and billing.

The implementation of discrete OMC-Rs and OMC-Ss using separate equipment, processors and workstations significantly increases overall system costs and interface complexity. This also increases operations and maintenance expenses because of the need to operate and maintain separate equipment. For example, an OMC-R and OMC-S may utilize identical data that may be stored locally at each OMC. In such a case, information must often be entered more than once. In addition to significantly increasing operations costs, overall system reliability may suffer because of the increased likelihood of data errors such that the same information is entered differently from OMC to OMC. When this occurs, the effect on the overall operation of the system can vary from, for example, catastrophic failure to biling errors. The implementation of discrete OMC-Rs and OMC-Ss further complicates the synchronization of data or information that is common to each of the discrete OMCs.

SUMMARY OF THE INVENTION

From the foregoing it may be appreciated that a need has arisen for a merged operations and maintenance center and method for operation that eliminates the problems outlined above. For example, an operator or craftsperson may monitor and enter subscriber information and radio related information at one location such that data integrity is provided. In accordance with the present invention, there is provided an application provider and method for communication that substantially eliminate and reduce the disadvantages and problems outlined above.

According to an aspect of the present invention, a merged operations and maintenance center in communication with a call processor of a telecommunications system is provided that includes various servers and a user interface. The servers may include a configuration management server for performing configuration management for radio and switch functions of the telecommunications system, a fault management server for performing fault management for radio and switching functions of the telecommunications system, and an accounting management server for performing accounting management. A database server will generally be provided to store event information, and the user interface provides access to the various servers and may be a graphical user interface.

The present invention provides a multitude of technical advantages. One technical advantage of the present invention includes the ability to provide operations and maintenance functions, both radio and switch related, using one system. This reduces overall system costs and increases data integrity by ensuring that data is not incorrectly or inconsistently entered from one OMC to another. Further, system reliability is increased because of the elimination of inconsistently entered data.

Another technical advantage of the present invention includes reduced opeational costs due to the fact that only one OMC system needs to be maintained and that redundant data entry is eliminated. Further, fewer operators may be needed to monitor and operate the telecommunications system because of the ability to provide all alarms and events at one system or interface, whether radio or switch related.

Yet another technical advantage includes the ability to use an inexpensive user interface that provides graphical user interfaces so that a telecommunications system can be managed and operated with ease. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description of one embodiment of the present invention, wherein like reference numerals represent like parts, in which.

DETAILED DESCRIPTION OF THE INVENTION

Figure 1:
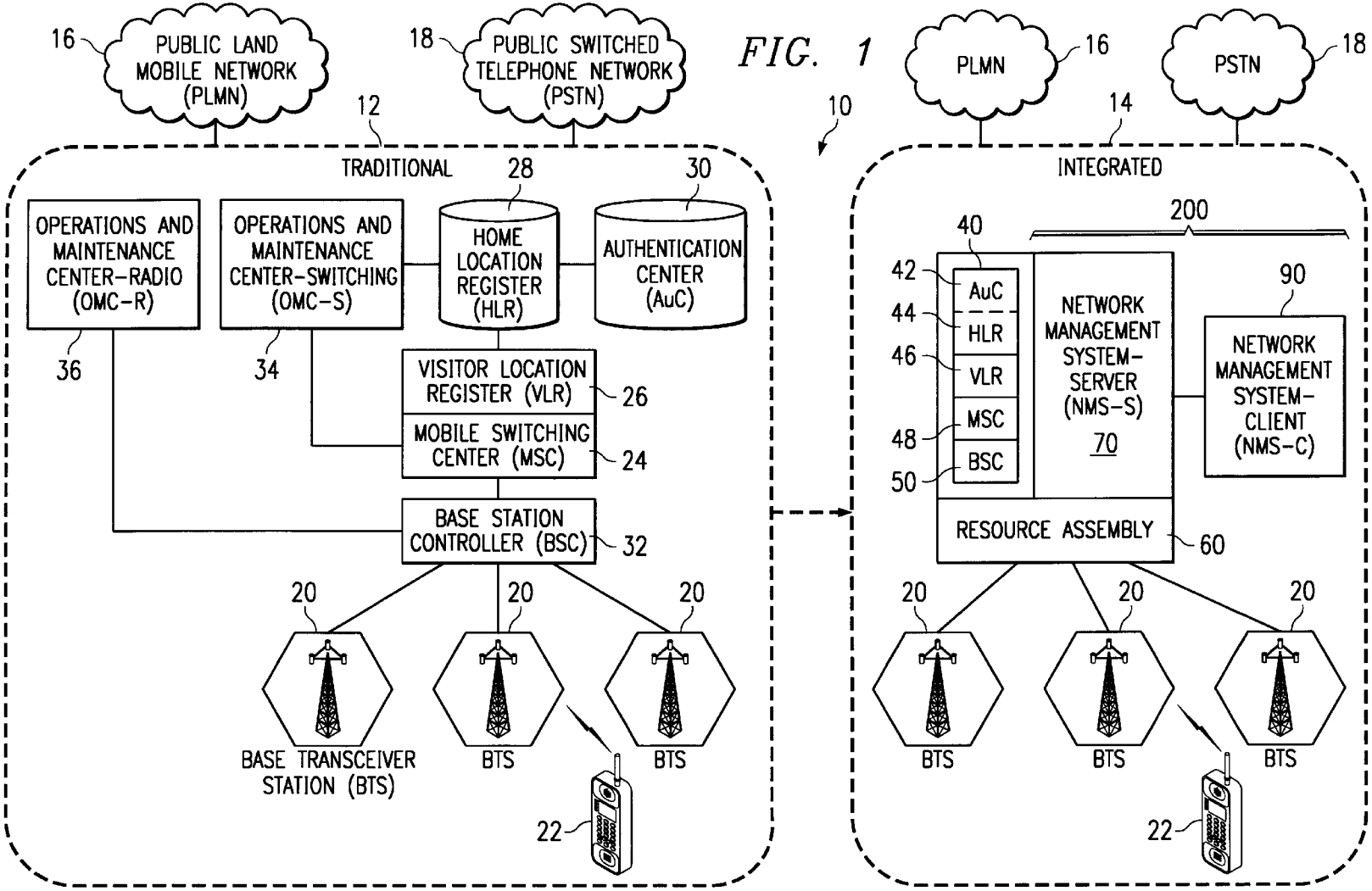
FIG. 1 is a block diagram illustrating the integration of a traditional wireless telecommunications system into an exemplary integrated wireless telecommunications system.

FIG. 1 is a block diagram 10 illustrating the integration of a traditional wireless telecommunications system 12 into an exemplary integrated wireless telecommunications system 14. The traditional wireless telecommunications system 12 and the integrated wireless telecommunications system 14 are illustrated as Global System for Mobile Communications (GSM) wireless telecommunications systems. However, it should be understood at the outset that the present invention, although illustrated herein using a GSM wireless telecommunications system, is in no way limited to GSM wireless telecommunications systems and may be implemented in a variety of wireless telecommunications systems using any of a variety of technologies and technical standards. For example, and without limitation, the present invention may be implemented in wireless telecommunications systems implementing the following technologies and technical standards: Code Division Multiple Access (CDMA); Time Division Multiple Access (TDMA); Frequency Division Multiple Access (FDMA); and Personal Communications Service (PCS).

The traditional wireless telecommunications system 12 and the integrated wireless telecommunications system 14 are shown coupled to a Public Land Mobile Network (PLMN) 16 and a Public Switched Telephone Network (PSTN) 18 for the exchange of information, including, for example, both voice and data. Of course, although PLMN 16 and PSTN 18 are public networks, the traditional wireless telecommunications system 12 and the integrated wireless telecommunications system 14 may also interface with private networks.

The traditional wireless telecommunications system 12 and the integrated wireless telecommunications system 14 preferably include one or more Base Transceiver Stations (BTSs) 20 for communication through a common air interface or radio interface to a subscriber unit 22. The information exchanged through the common air interface or radio interface is provided as a digital signal in digital wireless telecommunications systems and as an analog signal in analog wireless telecommunications systems. This exchange of information may be encrypted to enhance privacy and security.

The remaining subsystems of the traditional wireless telecommunications system 12 and the integrated wireless telecommunications system 14 may be referred to as a wireless telecommunications switch. Many of the components or sub-systems of the traditional wireless telecommunications system 12 have been integrated to provide the novel solution illustrated by the integrated wireless telecommunications system 14. This integration may be best understood by first describing the various sub-systems of the traditional wireless telecommunications system 12 and then the integrated wireless telecommunications system 14.

The traditional wireless telecommunications system 12 includes, in addition to one or more of the BTSs 20 and subscriber units 22, a wireless telecommunications switch that may generally be defined to include the remaining components shown in FIG. 1. For example, in a GSM wireless telecommunications system, these components may include a Base Station Controller (BSC) 32, a Mobile Switching Center (MSC) 24, a Visitor Location Register (VLR) 26, a Home Location Register (HLR) 28, an Authentication Center (AuC) 30, an Operations and Maintenance Center—Switching (OMC-S) 34, and an Operations and Maintenance Center—Radio (OMC-R) 36. With the exception of the MSC 24 and the VLR 26, each of these components or sub-systems of the wireless telecommunications switch is generally implemented as a separate piece of equipment, often from different manufacturers, that must be separately maintained and interfaced. As mentioned above, this is expensive, cumbersome and suffers from various disadvantages.

The BSC 32 is provided between the one or more BTSs 20 and the MSC 24 and provides control to the one or more BTSs 20. The BSC 32 is implemented as a stand-alone computer that manages the radio resources for the one or more BTSs 20 including radio-channel setup, frequency hopping and handovers. The BSC 32 tracks the various radio channels used by the one or more BTSs 20 and the subscribers that are using each radio channel. The BSC 32 allocates and releases the radio channels and regulates the transmit power level of the antennas of the one or more BTSs 20. As the subscriber unit 22 moves closer to an antenna, the BSC 32 lowers the transmitter power level, and as the subscriber unit 22 moves away from the antenna, the BSC 32 raises the transmitter power level.

In a GSM wireless telecommunications system, the BSC 32 can support and control multiple BTSs 20 through a proprietary link referred to as an Abis link. Information is generally exchanged between the one or more BTSs 20 and the BSC 32 at sixteen kbps. The LAPD protocol may be used for signaling. The proprietary Abis link normally requires the BSC 32 and the one or more BTSs 20 to be provided by the same manufacturer. This can substantially increase overall system costs. The BSC 32 may be implemented as a switch with significant computational capability. The BSC 32 may also include a Transcoder/Rate Adapter Unit (TRAU) that performs system dependent coding, such as GSM-specific speech encoding and decoding, and rate adaptation.

The BSC 32 also interfaces and exchanges information with the MSC 24 through a link defined in the GSM specifications and referred to as the "A" interface. Signaling information, normally using the Signaling System 7 (SS7) protocol, is exchanged between the BSC 32 and the MSC 24. Voice and data are also exchanged at sixty-four kbps. The BSC 32 may use the TRAU to convert the voice and data between sixteen kbps and sixty-four kbps.

The OMC-R 36 is a stand-alone sub-system that interfaces with the BSC 32. The OMC-R 36 manages and monitors the functions and operations of the BSC 32 and the one or more BTSs 20. The OMC-R 36 includes a user interface and is provided as a stand-alone workstation. Generally, the OMC-R 36 will be manufactured by the same company that manufactures the BSC 32 and the BTSs 20 that it manages and monitors. The OMC-S 34 is a separate stand-alone workstation that will be described more fully below.

The MSC 24 functions as a switch to connect calls from sender to receiver, to collect the details of calls made, and to supervise the operation of the remainder of the switch. As mentioned above, the MSC 24 is in contact with its mobile subscribers through the BSC 32. The MSC 24 interfaces with the BSC 32 through the A interface so that information, including signaling information, may be exchanged. The MSC 24, although not explicitly shown in FIG. 1, also interfaces with external networks such as the PLMN 16 and the PSTN 18 so that mobile subscribers, such as subscriber unit 22, can communicate with others outside of the traditional wireless telecommunications system 12. The MSC 24 can control or interface with multiple BSCs 32. In many switches, the MSC 24 and the VLR 26 are integrated in the same sub-system.

The combination of the MSC 24, the VLR 26, the HLR 28 and the AuC 30 function to provide mobility management to the wireless telecommunications switch. The VLR 26 provides a database containing information on all active subscriber units of the traditional wireless telecommunications system 12, including roaming subscriber units. An active subscriber unit is one that has requested access to the traditional wireless telecommunications system 12. The database of the VLR 26 provides a temporary subscriber record for each active subscriber unit being served by the MSC 24.

The VLR 26 is operated as part of the signaling network and receives information to generate this temporary subscriber record from the HLR of each active subscriber unit. Information in the VLR 26 is generally retained for a set period of time, hence the reference to a temporary subscriber record, and includes such information as the subscriber's International Mobile Subscriber Identity Number (IMSI), information about the subscriber's services and features. The VLR 26 may also assist with recording the location of a local subscriber unit and communicates with the HLR and other sub-systems using signaling information such as SS7 Mobile Application Part (MAP) messages.

The HLR 28 is the central repository for all information required to allow a customer to access and use the wireless telecommunications switch, such as a GSM switch. The information stored in the HLR 28 may be referred to as a subscriber database. The HLR 28 generally does not store information such as the customer's name or home address, that type of information is often stored in a billing or accounting system and could be stored in the OMC-S 34. The HLR 28 is an intelligent database used to store subscriber related information, such as features and services, and the location information needed to provide wireless telecommunications services. The subscriber information stored in the HLR 28 is for all subscribers in an operator's network such as those subscribers of the traditional wireless telecommunications system 12. When these subscribers are roaming and using other wireless telecommunications networks, the HLR 28 provides pertinent information to the VLR of the visited system. The HLR 28 is operated as part of the signaling network. Information and data requests from/to the HLR 28 are provided using the signaling network, such as SS7 MAP messages.

The AuC 30 interfaces with HLR 28 and is used to authenticate a subscriber unit. Authentication is the process whereby a subscriber unit that requests access to a wireless telecommunications system, including roaming subscriber units, must prove it is not a fraud or counterfeit. The AuC 30 operates as part of the signaling network and stores information used in the authentication process for subscribers to the traditional wireless telecommunications system 12.

Authentication may be accomplished in a number of different ways, some more secure than others. GSM wireless telecommunications systems are generally considered very secure while many others are not. In some non-GSM systems, secret keys are exchanged between the system and the subscriber unit through the radio interface during authentication. These systems are generally considered less secure because of the increased possibility of intercepting and deciphering the secret keys.

In a GSM wireless telecommunications system, the AuC 30 includes complex mathematical algorithms used in the authentication process and a database to store an encrypted Authentication Key (Ki) corresponding to each of the subscriber units of the traditional wireless telecommunications system 12. The complex mathematical algorithms may include an A-3 algorithm and an A-8 algorithm as outlined by the GSM specifications and as determined by each wireless telecommunications system operator. Each of the subscriber units 22 include a memory, such as a Subscriber Identity Module (SIM) provided as either a "smartcard" or a module, that stores a corresponding encrypted Ki, an A-3 algorithm and an A-8 algorithm.

The AuC 30 also assist with encryption of the information exchanged between the subscriber unit 22 and the BTS 20 over the air or radio interface. As mentioned above, the network Kc and the subscriber Kc are used later to encrypt the information provided over the air or radio interface. This increases privacy and security and eliminates eavesdropping.

Although not expressly shown in FIG. 1, the various sub-systems of the traditional wireless telecommunications system 12, such as the VLR 26, the MSC 24, the HLR 28 and the AuC 30 communicate using a Mobile Application Part (MAP) and interface with the signaling network through a MAP Provider. The MAP Provider provides an interface to a Transaction Capabilities Application Part (TCAP) of the SS7 protocol.

The OMC-S 34 is another dedicated sub-system designed to manage and monitor the wireless telecommunications switch that includes the MSC 24, the VLR 26, the HLR 28 and the AuC 30. The dedicated OMC-S 34 and the dedicated OMC-R 36 are identified in the GSM specifications. The OMC-S 34 receives event alarms and system status/operational information that is critical to the operation of the traditional wireless telecommunications system 12. These alarms and system status/operational information may be logged for future analysis if needed. The OMC-S 34 may also be used to control, start and shut down certain equipment. Just as with the OMC-R 36, the OMC-S 34 will also generally be manufactured by the same company that manufactures the wireless telecommunications switch that it manages and monitors. In addition to its network operations and maintenance functions, the OMC-S 34 may also interface with a subscription management system.

The subscription management system may access and modify subscriber information stored in the subscriber database of the HLR 28. For example, the subscription management system may be used to update the subscriber information stored in the HLR 28, to add new subscribers including a Ki in the database of the AuC 30, to modify an existing subscriber's profile and to change the services and features available to the subscriber.

Referring now to the exemplary integrated wireless telecommunications system 14, many of the components or sub-systems of the traditional wireless telecommunications system 12 have been integrated to provide the novel solution illustrated by the integrated wireless telecommunications system 14. Generally, the functionality of the BSC 32, the MSC 24, the VLR 26, the HLR 28 and the AuC 30 of the traditional wireless telecommunications system 12 has been integrated in the integrated wireless telecommunications system 14 as a call processor 40 and a resource assembly 60. The call processor 40 provides the overall switching and subscriber control to the integrated wireless telecommunications system 14 using signaling information and subscriber information. Significantly, the functionality of the OMC-S 34 and the OMC-R 36 has been integrated into a merged operations and maintenance center 200. In the one embodiment of FIG. 1, the merged operations and maintenance center 200 is implemented with a Network Management System-Server (NMS-S) 70 and a Network Management System-Client (NMS-C) 90. However, it should be understood that the present invention is not limited to any one implementation of the merged operations and maintenance center 200.

The call processor 40, the resource assembly 60, the NMS-S 70, and the NMS-C 90 may communicate using virtually any available communication means such as through a Local Area Network (LAN), such as an Ethernet LAN. The integrated wireless telecommunications system 14 is described more fully below and in connection with FIG. 2 where a more detailed implementation of the exemplary integrated wireless telecommunications system 14 is presented. It should also be noted that the integrated wireless telecommunications system 14 will generally be fully redundant to increase overall system reliability and availability. For example, the NMS-S 70s will generally be provided in a redundant configuration such that data may be mirrored between the redundant NMS-Ss. In a preferred embodiment, the redundant NMS-S 70 will provide a redundant configuration in a "warm" standby mode.

The resource assembly 60 provides the physical connections with the one or more BTSs 20, the PLMN 16 and the PSTN 18 so that voice, data and signaling information may be exchanged. The resource assembly 60 may include any number of redundant circuit modules and controllers such as an interface module, a switching module, a telephony support module and a signal processing module. The interconnections with the one or more BTSs 20, the PLMN 16 and the PSTN 18 may be provided through the interface module, such as a quad span module, so that information may be exchanged through a telecommunications link or span such as, for example, an E-1 or T-1. The switching module may include a switching matrix to connect calls from sender to receiver and bus arbitration circuitry to arbitrate a control bus and a high speed bus, such as a Pulse Code Modulation (PCM) bus, of the resource assembly 60. The high speed bus can carry both voice and data.

The telephony support module of the resource assembly 60 may generate all needed tones such as trunk tones for trunk signaling and busy tones that may be provided on the high speed bus as needed. The telephony support module may also generate or store pre-recorded messages for playback as needed. Finally, the signal processing module may include one or more digital signal processors (DSPs) and associated software to perform echo cancellation when needed and to serve as a TRAU as described previously with respect to the BSC 32. Each of those modules of the resource assembly 60 preferably include software. Although the functionality of the resource assembly 60 has been described with respect to various modules, it should be understood that the functionality could be achieved using virtually any combination of software and hardware, with our without modules.

The call processor 40 uses signaling information and subscriber information to provide the overall switching control and subscriber control to the functionality provided by the resource assembly 60. In an exemplary embodiment, the call processor 40 may be implemented using a dedicated computer, such as a computer motherboard using an Intel Pentium microprocessor, and various software processes or applications that include software objects. For example, a 200 MHz Pentium with 64 Mbytes of memory and a 1 Gbyte hard drive may be used to implement the call processor 40. The call processor 40 may also operate under the control of an operating system capable of processing real-time data such as, for example, the QNX operating system, the MICROSOFT WINDOWS NT operating system, and the like.

Figure 2:
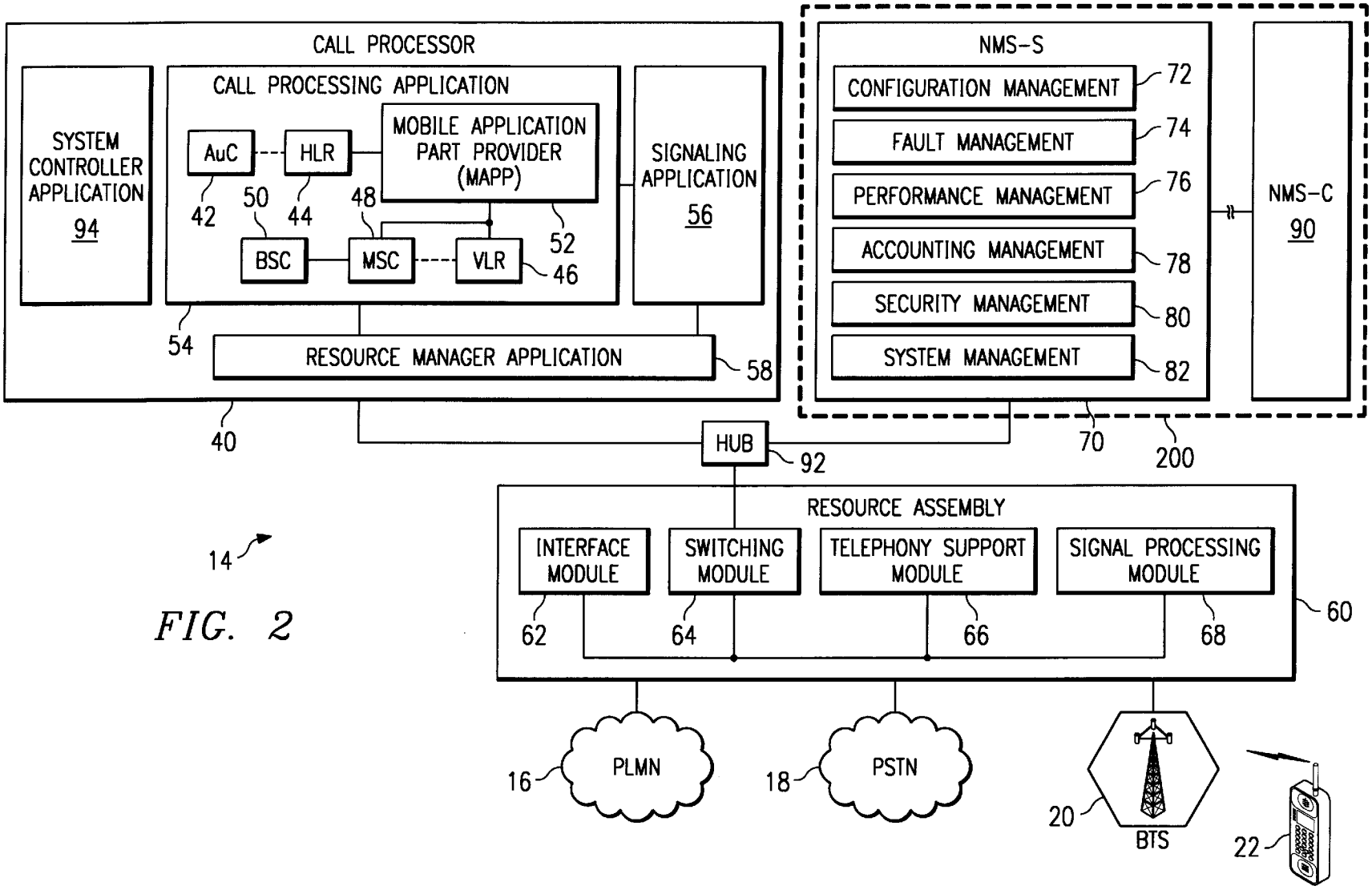
FIG. 2 is a block diagram illustrating the functional blocks of the exemplary integrated wireless telecommunications system in more detail that includes a merged operations and maintenance center.

The call processor 40, which is illustrated in more detail in FIG. 2, includes an application process that comprises the following objects: an Authentication Center (AuC) 42, a Home Location Register (HLR) 44, a Visitor Location Register (VLR) 46, a Mobile Switching Center (MSC) 48, and a Base Station Controller (BSC) 50. The AuC 42 and the HLR 44 may be integrated in one software object or as two separate objects of the same application process or executable file. The AuC 42 and the HLR 44 may serve multiple telecommunications switches in addition to the one provided in the integrated wireless telecommunications system 14. These software objects provide related control functionality to the dedicated, and often separate, systems previously described for the traditional wireless telecommunications system 12. Although not expressly illustrated in FIG. 1, the call processor 40 will also include a Mobile Application Part Provider (MAPP) and a signaling application that are used to coordinate communication with the signaling network and to provide an interface to TCAP of the SS7 protocol. The MAPP and signaling application may be implemented as software objects and are illustrated more fully below in connection with FIGS. 2 through 6. The MAPP allows any of the sub-systems of the call processor 40, such as the AuC 42, the HLR 44, the VLR 46 and the MSC 48, to efficiently communicate with one another without having to use TCAP and other SS7 layers and protocols. This reduces overall congestion and loading of the signaling network while reducing the processor loading on the call processor 40.

Each of the software objects of the call processor 40 will generally contain procedures, sometimes referred to as methods in object-oriented programming terminology, and data, sometimes referred to as variables or data elements. The software objects communicate with one another using a message. A message is provided from a sender software object to a receiver software object and includes the name of the receiver software object and the name of the procedure or method to be executed by the receiver software object. The message may also include a parameter for use by a procedure.

The call processor 40 may communicate with the resource assembly 60 and the NMS-S 70 through the Ethernet LAN. In an exemplary embodiment, the call processor 40 communicates with the NMS-S 70 using an Object Request Broker (ORB) such as the Common Object Request Broker Architecture (CORBA) standard by the Object Management Group (OMG). This provides standard object-oriented interfaces between external applications and platforms to provide interoperability of object-oriented software systems residing on disparate platforms. In an exemplary embodiment, the call processor 40 communicates with the resource assembly 60 using Sockets so that Transmission Control Protocol/Internet Protocol (TCP/IP), or the like, can be used for exchanging information.

The AuC 42, which may be implemented in the same software object as the HLR 44, may include a procedure to generate an authentication set or authentication triplets in response to the subscriber unit 22 requesting access to the integrated wireless telecommunications system 14. This request is generally received at the HLR 44 from the VLR 46 which in turn requests the AuC 42 to generate the authentication set for this subscriber unit 22. The request may come in the form of a message that requests the execution of a procedure in the AuC 42 and a parameter that includes the IMSI of the subscriber unit 22 being authenticated. The AuC 42 also preferably includes a database of encrypted Kis for each subscriber unit, such as subscriber unit 22, that uses the integrated wireless telecommunications system 14 as its home system, an A-3 algorithm and an A-8 algorithm. The A-3 algorithm and the A-8 algorithm may be provided as one or more procedures of the AuC 42.

The HLR 44 and the VLR 46 perform the functions previously described for the HLR 28 and the VLR 26. The HLR 44 and the VLR 46 include databases with subscriber information. The MSC 48 and the BSC 50 also perform the same general functions previously described for the MSC 24 and the BSC 32 with a few noted exceptions. The MSC 48 controls the switching of calls, collects the details of calls made, and supervises the operation of the remainder of the switch. The MSC 48 is in contact with its mobile subscribers through the BSC 50 and the resource assembly 60. The interface between the MSC 48 and the BSC 50 can still be maintained as an A type interface as defined by the GSM specifications and, in an exemplary embodiment, will be provided using CORBA for communication between these two software objects. The MSC 48 controls a switching matrix of the resource assembly 60, such as the switching matrix of a switching module. It should also be mentioned that, just as with the VLR 26 and the MSC 24, the VLR 46 and the MSC 48 may be integrated. Thus, the VLR 46 and the MSC 48 may be implemented in the same software object.

The BSC 50 is implemented as a software object to manage the radio resources for the one or more BTSs 20, including radio-channel setup, frequency hopping and handovers, through the resource assembly 60. The BSC 50 preferably does not include a TRAU like the BSC 32. As mentioned above, the TRAU may be provided in the resource assembly 60.

In an exemplary embodiment, the NMS-S 70 and the NMS-C 90 communicate with one another through the Ethernet LAN using CORBA, which is platform independent. The functional combination of the NMS-S 70 and the NMS-C 90 may be referred to as one embodiment of the merged operations and maintenance center 200. The NMS-C 90, in one embodiment, may be implemented using a personal computer provided locally or remotely to the NMS-S 70 and operating under the control of an operating system such as, for example, MICROSOFT WINDOWS 95, MICROSOFT WINDOWS NT WORKSTATION, and the like. If the NMS-C 90 is provided remotely, a modem, not shown in FIG. 1, will generally be provided to enable communication with the NMS-S 70. The NMS-S 70, in an embodiment, may be implemented using a dedicated computer, such as a personal computer motherboard using an Intel Pentium microprocessor, similar to the call processor 40. The NMS-S 70 preferably operates under the control of an operating system such as MICROSOFT WINDOWS NT SERVER and the like.

The NMS-S 70 and the NMS-C 90 include software objects used to perform the operations and maintenance previously performed by dedicated and distinct systems such as the OMC-S 34 and the OMC-R 36. This includes such functions as managing and monitoring the operations of the BSC 50 and the one or more BTSs 20, the MSC 48, the VLR 46, the HLR 44, the AuC 42, the resource assembly 60 and other applications, such as a signaling application and other applications described below in connection with FIGS. 2 and 3. The NMS-S 70 may receive and log event alarms and system status/performance information. This information may be viewed, as desired, by the NMS-C 90. The NMS-S 70 and the NMS-C 90 may also provide subscription management so that subscriber information may be accessed and modified as desired. Subscription management may also allow subscription information provided in the HLR 44 to be updated. Further, the subscription management of the NMS-S 70 and the NMS-C 90 may also provide call processing information that may then be used for the accounting and billing functions needed for the integrated wireless telecommunications system 14. The NMS-S 70 and the NMS-C 90 may further provide such functions as performance management as will be described more fully below.

In alternative embodiments, the NMS-S 70 may be enabled with web server software such as NETSCAPE COMMUNICATOR, MICROSOFT WINDOWS NT, and the like while the NMS-C 90 may be enabled with web browser software such as NETSCAPE NAVIGATOR, MICROSOFT INTERNET EXPLORER, and the like. In such a case, the NMS-90 can access the NMS-S 70 through the Internet or through an intranet using a familiar graphical user interface. This provides significant flexibility when monitoring and operating the integrated wireless telecommunications system 14 and decreases the training time needed to train operations personnel. The NMS-S 70 and the NMS-C 90 also provide the significant advantage of allowing all data entry to be performed at one location, i.e., the NMS-C 90. This is in contrast to other systems where data must be entered, sometimes the same data, in multiple systems. In addition to the additional labor and time needed to enter data, the opportunity is present for the same data to be entered differently in different systems. In such a case, unpredictable results may occur, including system failure.

FIG. 2 is a block diagram illustrating the functional blocks of the exemplary integrated wireless telecommunications system 14 in more detail that includes the merged operations and maintenance center 200. The exemplary integrated wireless telecommunications system 14 is designed to be compatible with the GSM specifications and includes the call processor 40, the NMS-S 70, the NMS-C 90, a hub 92 and the resource assembly 60. The PLMN 16, the PSTN 18, and the one or more BTSs 20, including the one or more subscriber units 22, are illustrated in communication with the resource assembly 60. The call processor 40, in one embodiment, includes a call processing application 54, a signaling application 56, a system controller application 94 and a resource manager application 58. Each of these applications preferably include at least one computer software object that can communicate with other software objects of the call processor 40 using an ORB, such as CORBA or the like. It should be mentioned that these various computer software objects may be developed using virtually any computer programming language but will preferably be developed using a computer programming language designed for object-oriented programming such as C++, JAVA and the like.

The system controller application 94 is responsible for ensuring that the call processor 40 is operating properly by periodically testing the other applications of the call processor 40. A successful test of an application of the call processor 40 may comprise, for example, observing a predetermined response from the application after sending a predetermined message to the application. This may be referred to as "pinging." The system controller application 94 may also exchange requests from the various servers of the NMS-S 70 so that information may be provided from or exchanged with an application or object of the call processor 40 and a server of the NMS-S 70.

The signaling application 56 provides the logic needed to provide signaling functionality to the integrated wireless telecommunications system 14. More specifically, the signaling application 56 provides SS7 functionality to the call processing application 54 so that the integrated wireless telecommunications system 14 will have SS7 connectivity to the PLMN 16 and the PSTN 18. The SS7 functionality of the signaling application 56 may be grouped into call-setup functions and non call-setup or transaction functions. The call-setup functions are concerned with setting up and then releasing or tearing down calls, while the non call-setup or transaction functions involve providing services that generally require a database query to determine how to proceed with a call.

The signaling application 56 is responsible for performing various functions and providing user interfaces associated with the various parts and protocols of SS7. SS7 provides a transport mechanism for exchanging signaling information, such as MAP messages, using out-of-band signaling. SS7 signals include several parts, each having a distinct protocol. Specifically, SS7 signals include: (a) a three lower layer Message Transfer Part (MTP), which apply to basic routing of signaling messages between signaling points, (b) a Signaling Connection Control Part (SCCP) and a Transaction Capabilities Application Part (TCAP), which apply to additional routing and management functions for the transfer of messages and for database queries used for non call-setup or transaction functions such as the exchange of MAP messages, and (c) a Telephone User Part (TUP) and an Integrated Services User Part (ISUP), which apply generally to setting up, coordinating and taking down trunk calls and other call-setup functions. Although the signaling application 56 may be implemented in any of a variety of ways, one embodiment includes providing the upper SS7 layers, such as the TCAP, the SCCP and the highest MTP layer as software objects of the call processor 40, while the lower two MTP layers may be provided as part of a signaling line card that interfaces with the call processor 40. The signaling line card may provide a direct physical connection to an interface module 62 of the resource assembly 60 so that signaling information may be efficiently exchanged with the resource assembly 60.

The signaling application 56 is in communication with the resource manager application 58 and a Mobile Application Part Provider (MAPP) 52 and the MSC 48 of the call processing application 54. The MAPP 52 may be implemented as one or more software objects. The MAPP 52 and the signaling application 56 allow MSCs, VLRs and HLRs whether residing on the same or different nodes, to carry on MAP dialogues. The MAPP 52 determines whether a MAP message is destined for a sub-system of the integrated wireless telecommunications system 14 or a sub-system of another node. The MAPP 52 communicates the MAP messages destined for a sub-system of integrated wireless telecommunications system 14 to the appropriate sub-system while converting the MAP messages destined for another node to a TCAP message for use by the signaling application 56. In this manner, MAP dialogues between the VLR 46, the HLR 44 and the MSC 48 may be efficiently handled without requiring the use of the signaling application 56. This significantly reduces processor loading of the call processor 40.

The resource manager application 58 serves as the "bridge" or "conduit" between the call processor 40 and the resource assembly 60. The resource manager application 58 manages and allocates the resources of the resource assembly 60 with respect to the call processor 40 and enables different applications of the call processor 40 to interface with resources of the resource assembly 60. Preferably, the resource manager application 58 also provides an interface to resources of the resource assembly 60 for the signaling application 56 as well as other elements, such as the system controller application 94 and various elements of the NMS-S 70.

The resource manager application 58 is preferably implemented in software using object-oriented programming, and achieves the management and allocation of resources by employing distributed object technology, such as CORBA. In accordance with an exemplary embodiment, the resource manager application 58 provides a proxy object for each object or application outside the resource manager application 58 which may seek to interface with the resource manager application 58. Similarly, each such object or application is provided with a counterpart proxy object. An interface is defined between each proxy object of the resource manager application 58 and the object or application to which it corresponds, as well as between each counterpart proxy object and the resource manager application 58. An interface can be defined (such as by using Interface Definition Language or IDL) to establish acceptable messages and responses that can be exchanged over the defined interface. When a particular object or application desires to interface with a resource of the resource assembly 60, a message is sent from that object or application to the counterpart proxy object of that element or application. That counterpart proxy object then, in turn, forwards the request to the resource manager application 58 in conformance with the defined interface. Similarly, when the resource manager application 58 desires to interface with a particular object or application (for example, the call processing application 46) with respect to a resource of the resource assembly 60, a message is sent to the proxy object of the resource manager application 58 corresponding to the particular object or application. That proxy object then, in turn, forwards the request to the particular object or application in conformance with the defined interface.

The call processing application 54 includes various software objects, all of which have been previously introduced and described in relation to FIG. 1. Once again the BSC 50 is responsible for management of the BTSs 20 and their radio interfaces with subscriber units 22, including the allocation and release of radio channels associated with a given radio interface and management of handovers from one BTS 20 to another BTS 20. The BSC 50 manages the one or more BTSs 20 and their radio interfaces through the allocation, release and handover of radio transmission channels. The BSC 50 may carry out various procedures that relate to call connection tasks. For example, the BSC 50 may be responsible for system information broadcasting, subscriber paging, immediate traffic channel assignment, subsequent traffic channel assignment, call handover, radio connection and release, connection failure detection and reporting, and power capability indication reporting. The BSC 50 may also be responsible for management of both the Abis link and the A interface. In an exemplary embodiment, the BSC 50 controls a TRAU provided in a signal processing module 68 of the resource assembly 60 through the resource manager application 58.

The MSC 48 and the VLR 46 may be integrated together or separately, as indicated by the dashed line in FIG. 2. The MSC 48 controls the switching of calls, collects the details of calls made, and supervises the operation of the remainder of the switch. The MSC 48 is primarily responsible for mobility management, call control and trunking, such as coordinating the setting-up and termination of calls to and from the subscriber units 22. Additionally, MSC 48 provides all of the functionality needed to handle the mobility of the one or more subscriber units 22 through location updating, handover and call delivery.

The MSC 48 is in contact with the subscriber units 22 through the A type interface with the BSC 50, the resource manager application 58 and the resource assembly 60. The A interface provides the link for managing traffic channels/transcoders, and also provides the MSC 48 with access to the Abis interface for message flow with the subscriber units 22. The Base Station Subsystem Management Application Part (BSSMAP) protocol may be employed to transmit connection-related messages and paging messages between the MSC 48 and BSC 50. The MSC 48 controls a switching matrix of a switching module 64 of the resource assembly 60. For example, the MSC 48 is operable to process a service request from the subscriber unit 22, and route a corresponding call to a designated destination such as the PLMN 16, the PSTN 18 or to another one of the subscriber units 22. Similarly, the MSC 48 is operable to process a service request from a remote subscriber through, for example, the PLMN 16, or the PSTN 18 and route a corresponding call to a designated one of the subscriber units 22.

The VLR 46, the HLR 44 and the AuC 50 function as previously described in detail with respect to FIG. 1 except that the MAPP 52 is expressly provided to allow the VLR 46 and the HLR 48 to exchange MAP messages. The dashed line between the HLR 44 and the AuC 50 indicates that these software objects could be implemented as distinct software objects or as one software object having the same functionality. The VLR 46 provides a database containing information on all active subscriber units of the exemplary integrated wireless telecommunications system 14, including roaming subscriber units. Whenever an active subscriber unit such as the subscriber unit 22 requests service, an authentication must be performed. The authentication will include the subscriber unit's AuC.

As discussed above, the MAPP 52 may work with the signaling application 56 when it receives a request from the VLR 46 to send a MAP message, such as a request to get authentication information from the HLR 44 and the AuC 42. The MAPP 52 is the logical link between the VLR 46 and the HLR 44 and provides the dialogues through which they communicate with each other and with other elements and objects. Since the HLR 44 and the VLR 46 are both sub-systems at the same node, the MAPP 52 provides this dialogue directly without having to use the signaling application 56. Otherwise, the MAPP 52 converts a MAP message destined for a sub-system of another node to a TCAP message for use by the TCAP of the signaling application 56 for non-call related signaling. Thus, a MAP messages between the VLR 46 and an external HLR will be converted to a TCAP message while messages between the VLR 46 and an HLR 44 will not. Authentication sets or triplets may be provided from the HLR 44 and the AuC 42 to the VLR 46 using the MAPP 52.

The NMS-S 70, in an exemplary embodiment, includes several elements for configuring and managing elements of the call processor 40 and the various resources of the resource assembly 60. Specifically, the NMS-S 70 preferably includes a configuration management element 72, a fault management element 74, a performance management element 76, an accounting management element 78, a security management element 80, and a system management element 82. These elements provide operations, administration, maintenance and provisioning related services, and preferably include one or more logical servers implemented as one or more software objects or programs that are implemented, preferably, using object-oriented technology. The various elements of the NMS-S 70 are referred to as servers in the description provided later in connection with FIG. 3. These elements or servers may be accessed using the NMS-C 90, which serves as a client to the NMS-S 70 and provides all needed interfaces that are preferably provided as Graphical User Interfaces (GUIs).

In a preferred embodiment, the functions of the NMS-S 70 provide an object model based on a Telecommunications Management Network (TMN) model provided by the International Standards Organization (ISO). The TMN model is a network management model defined in ITU-T recommendation M.30 and related recommendations that includes five categories of network management.

The configuration management element 72 includes one or more servers to provide services necessary to administer the configurable attributes of the functional elements, subsystems and modules, as previously and hereinafter described, associated with the call processing application 54, the resource manager application 58 and the signaling application 56. Generally, the configuration management element 72 deals with installing, initializing, loading, modifying and tracking various configuration parameters of network hardware and software. In one embodiment, the NMS-C 90 provides a configuration monitor or GUI that identifies the various applications and or objects of the call processor 40 to allow an operator to configure the corresponding functional components of the call processing application 54, the resource manager application 58 and the signaling application 56 using the servers of the NMS-S 70.

The configuration management element 72 may be used to modify subscriber information of a server subscriber database of the NMS-S 70. The server subscriber database will preferably be initially stored off-line in a hard disk drive of the NMS-S 70. The updated subscriber information may then be provided to the call processing application 54 of the call processor 40 as needed. This will preferably occur at start-up but may also be provided at other times as needed, such as when a subscriber is added, deleted or modified. In this manner, the NMS-S 70 serves to insulate the call processor 40, including the call processing application 54, from non real-time functions such as the accessing and updating of the hard disk drive that stores the server subscriber database. This arrangement provides significant advantages to the integrated wireless telecommunications system 14.

As mentioned above, the call processor 40 performs real-time processing and will preferably operate under the control of an operating system capable of processing real-time data. Thus, it is essential that sufficient processing capability be dedicated and available to the call processor 40, including all of its applications such as the call processing application 54, so that real-time data and events can be properly and timely processed. The capability of the NMS-S 70 to allow subscriber information to be added, modified and stored in the server subscriber database in a manner that is off-line from the call processor 40 provides the significant advantage of allowing the call processor 40 to focus its processing capability on the processing of real-time data and events.

Additional processor savings are realized when the subscriber information is provided from the server subscriber database of the NMS-S 70 to the HLR 44 of the call processing application 54 such that the HLR 44 stores subscriber information that needs to be readily accessible in memory, such as a Random-Access Memory (RAM), and stores the remainder in a local hard disk drive of the call processor 40. RAM can be accessed much more quickly and efficiently as compared to a mass storage device such as a hard disk drive. Similar savings are realized using the configuration element 72 to configure such elements as the VLR 46, the MAPP 52, the MSC 48, the BSC 50, the RM 58 and the SS7 functionality of the signaling application 56. The arrangement described above also serves to isolate and protect the call processor 40 from malicious acts. In effect, the NMS-S 70 serves as a firewall to the call processor 40.

The fault management element 74 provides for the detection, logging and reporting of alarms, errors, faults, state changes and selected events from the call processing application 54, the signaling application 56, the resource assembly 60 and other servers of the NMS-S 70. The fault management element 74 may isolate faults that occur in the system and a real-time fault monitor of the NMS-C 90 may be provided to interface with the fault management element 74 to display events, alarms and state changes for each component of the system as they occur. For example, SS7 alarms from the signaling application 56 may be received by the fault management element 74 and communicated to the NMS-C 90 for display.

Figure 3:
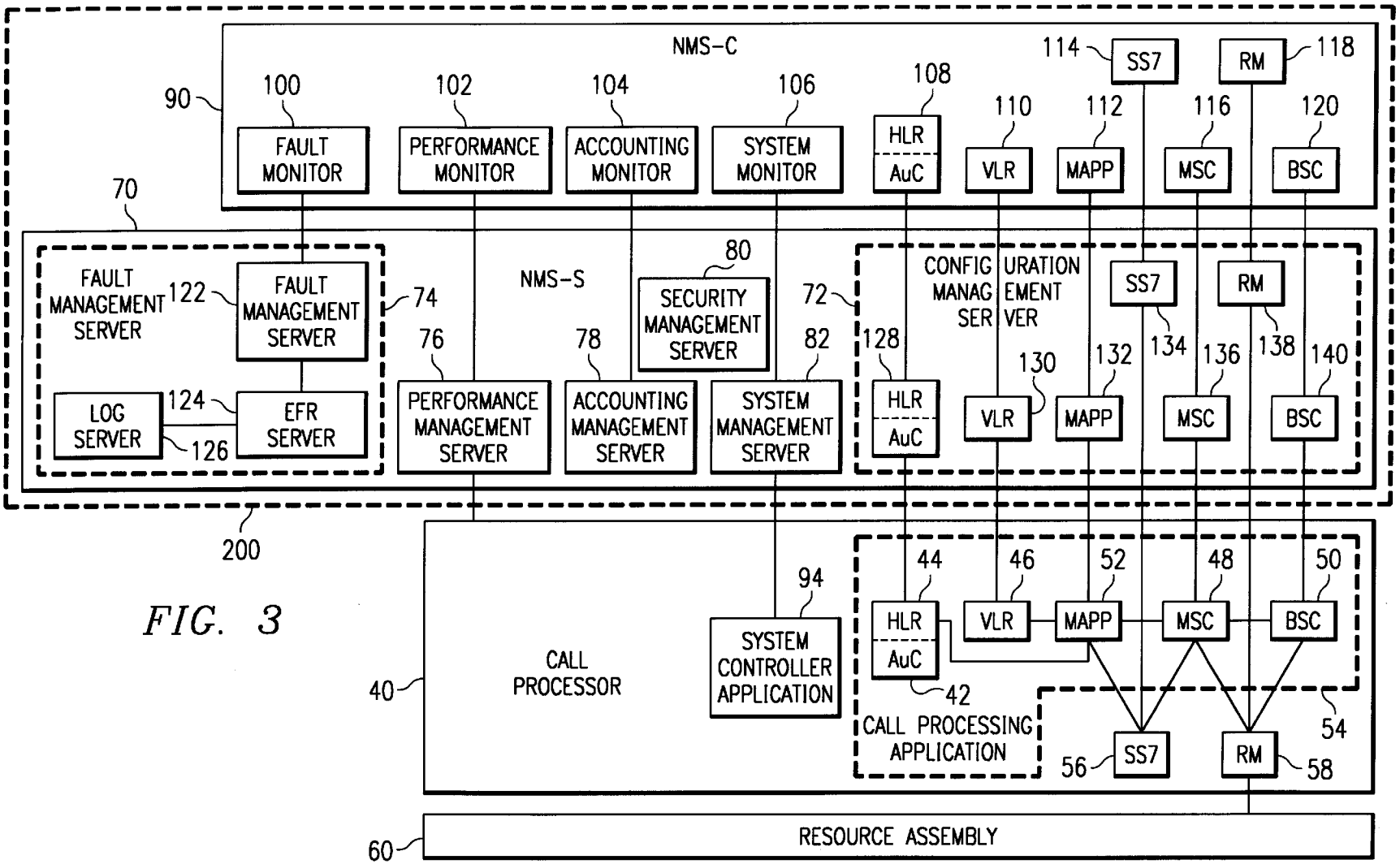
FIG. 3 is a block diagram illustrating an exemplary embodiment of the merged operations and maintenane center interfaced with a call processor.

In one embodiment, the fault management element 74 includes a fault management server, a log server and an Event Filtering and Routing (EFR) server, such as the fault management server 122, the log server 126 and the Event Filtering and Routing (EFR) server 124, all of FIG. 3. The fault management server collects and manages fault information, the log server archives alarms, and the EFR server receives event, alarm and state change information and routes this information to an appropriate server of the NMS-S 70, such as the fault management server, the log server or any other server. A fault monitor client of the NMS-C 90 may display fault information and allow acknowledgment and deletion of information.

The accounting management element 78 attends to the creation and storage of billing records for calls originated or terminated to the subscriber unit 22, as well as calls forwarded to or from the subscriber unit 22. Such billing records are in the form of a call data record and may be presented or generated as desired. In a preferred embodiment, the accounting management element 78 generates a billing record for each mobile origination, mobile termination and call forwarding attempt. Billing records may be of variable length and encoded based on ANS.1 and GSM Specification 12.05 on *Subscriber Related Event and Call Data*. The billing records may be archived to a disk or tape at predefined intervals such as on a daily basis.

The accounting management element 78 uses the EFR server of the fault management element 74 to have billing records routed from the call processing application 54 of the call processor 40. The accounting management element 78 may then use the log server of the fault management element 74 to encode and archive the billing records. An accounting monitor client of the NMS-C 90 allows billing records to be exported and downloaded for viewing and archiving.

The EFR server and the log server of the fault management element 74 may be used by virtually any element or server of the NMS-S 70 to provide event and alarm type information, hereinafter event information, as desired and to store such event information. In one embodiment, the EFR server may receive event information such as, for example, an alarm, a state change and status information, from the various applications and objects of the call processor 40 and the various other servers of the NMS-70. The information received by the EFR server of the NMS-S 70 may be filtered and routed to the log server and the fault management server, such as the log server 26 and the fault management server 122 of FIG. 3. For example, the EFR server may route all critical alarms to the log server for storage for later analysis.

The performance management element 76 measures and records resource utilization. In a preferred embodiment, the performance management element 76 collects performance management counters generated by the call processor 40 every fifteen seconds and can generate daily and weekly status reports and information on a per component basis. The performance management element 76 preferably can also archive information, export performance data and will be based on GSM Specification 12.04 on *Performance Management Guidelines* for a PLMN.

The security management element 80 provides for discriminatory access to OAM&P functions and information based on the given operator of the NMS-S 70. An operator accesses the NMS-S 70 through GUIs of the NMS-C 90. Various security levels are defined that determine the operations that are available to a given operator. The security management element 80 controls operator access to the various servers and the various functions provided by the servers of the NMS-S 70. In one embodiment in which the NMS-S 70 utilizes MICROSOFT WINDOWS NT SERVER as its operating system and the NMS-C 90 utilizes MICROSOFT WINDOWS NT WORKSTATION as its operating system, the security functions provided by these operating systems may be used to implement the functions of the security management element 80. Generally, the security management element 80 will provide such items as user ids, passwords and access levels for the various operators or crafts persons. Finally, the system management element 82 supports the start-up and recovery functions of the integrated wireless telecommunications system 14. The system management element 82 may be operable to initiate tests to assess the operation of various elements, objects and resources, and to cause the reset of such elements and resources in the event of incorrect operation. These various elements, objects and resources are provided at the call processor 40 and the resource assembly 60.

The resource assembly 60 provides the physical connections with the one or more BTSs 20, the PLMN 16 and the PSTN 18 so that voice, data and signaling information may be exchanged and is controlled and monitored by the call processor 54 and the NMS-S 70. The resource assembly 60 may include any number of redundant circuit modules, control busses and high speed busses. For example, in addition to the switching module 64 and the signal processing module 68, which have already been introduced, the resource assembly 60 includes an interface module 62 and a telephony support module 66. In an exemplary embodiment, the signal processing module 68, the interface module 62 and the telephony support module 66 interface through one or more of the switching modules 64. Control information is provided to these modules by the switching module 64 over a control bus, while data or information is provided to these modules by the switching module 64 over a high speed bus.

The switching module 64 may be implemented in software, hardware or a suitable combination of software and hardware. The switching module 64 preferably performs switching operations, clock operations, and local communications between resources of the resource assembly 60 of the integrated wireless telecommunications system 14. These operations may be performed using pulse code modulation switching and data transfer techniques, Link Access Protocol on the D Channel (LAP-D) communications and Ethernet interface communications.

A switch preferably resides within the switching module 64 to perform the switching functions and operations. The switch may be a timeslot switch having a memory timeslot matrix to make required timeslot cross-connections within the integrated wireless telecommunications system 14. The switch functions to set up and tear down both simplex and duplex connections between two specified channels, which may represent a call or other useful connections. For example, the switch may cause a channel (provided by, for example, the BTS 20 or the PSTN 18) to connect to a call progress tone or a voice announcement. Further, the switch may also set up system defined connections upon power up and reset as well as connections for the testing of timeslots when not in use. Timeslots are preferably provided to the timeslot switch via the high speed bus.

The switching module 64 may also, for example, include suitable digital data processing devices, a processor, random access memory and other devices. Preferably, each switching module 64 runs a suitable operating system, and includes one or more pulse code modulation bus interfaces, one or more High Level Data Link Controller (HDLC) control bus interfaces, one or more Ethernet interfaces, and an arbitration bus interface to other switching modules 64.

The telephony support module 66 may be implemented in software, hardware or a suitable combination of software and hardware. The telephony support module 66 may, for example, provide tone generation, digit transceiver functions, and digitized announcements. The telephony support module 66 may also provide call setup functions, such as digit collection and out-pulsing, and call completion functions, such as digitized announcement generation and call supervisory tone generation. The telephony support module 66 may, for example, include suitable telecommunications data processing equipment, such as a processor, random access memory, one or more redundant High Level Data Link Controller bus interfaces, one or more pulse code modulation buses, and an arbitration bus for establishing an active telephony support module 66 status. Preferably, a single telephony support module 66 provides all required telephony support functionality for the integrated wireless telecommunications system 14, and the one or more additional telephony support modules 66 are used to provide redundancy in the event of component or module failure.

The interface module 62 is an interface device that is used to interface a suitable number of telecommunications lines that carry data in a predetermined format, such as an E1 data format, with the integrated wireless telecommunications system 14. The one or more interface modules 62 provide the physical interface with other equipment, the PSTN 18, the PLMN 16 and the one or more BTSs 20. The interface module 62 also supports in-band trunk signaling for DSO data channels that are configured for channel associated signaling, and transmit data to and receive data from the signal processing module 68. The interface module 62 may be implemented in software, hardware or a suitable combination of software and hardware. For example, the interface module 62 may include suitable data processing equipment, such as a processor, random access memory, four E1 ports, redundant High Level Data Link Controller bus interfaces, and pulse code modulation bus interfaces.

The signal processing module 68 is preferably used to provide an interface between the call processor 40 and the signaling system. For example, signaling data may be received from a data transmission channel from the PSTN 18, and may be switched to another data transmission channel, such as an E1 telecommunications channel, from an interface module 62 to a signal processing module 68 by a switching module 64. A signal processing module 68 is also preferably employed to perform transcoding and rate adaption functions, such as converting from a wireless system speech encoding format to a pulse code modulation data format as well as other functions, such as echo cancellation functions. For example, signal processing module 68 may be employed by the integrated wireless telecommunications system 14 to convert data from the GSM data format to another format, such as the pulse code modulation data format.

One or more digital signal processors (DSPs) are preferably provided within the signal processing module 68. A multi-channel TRAU is preferably implemented in a DSP. That is, one or more DSPs preferably incorporate functions associated with the TRAU. Such DSPs preferably include multiple input and output buffers for storing multiple channel audio data, and perform rate adaption through an interrupt-driven routine that places the appropriate channel data onto both the near-end and far-end transmission lines at the appropriate data rate. With the implementation of rate adaption, such DSPs also have further processing power available to perform encoding and decoding of the incoming audio data. In addition to functions associated with the TRAU, an echo-cancellation capability may be advantageously provided by the DSPs by utilizing the already robust voice activity detection bits produced in transcoding a signal.

An E1 or T1 transmission line providing a 16,000 bits per second signal, which may carry four traffic channels, may be coupled to an interface module 62. That signal may, in turn, be connected to a DSP of the switching module 64 over the high speed bus. A DSP is further connected to a 64,000 bits per second transmission line also capable of carrying, for example, four traffic channels. The 64,000 bits per second transmission line can be, for example, a 64,000 bits per second PCM line. These lines are functionally bi-directional; each transmission line is connected to both an input and output of the DSP. The DSP may be further connected via an address bus, a data bus, and a control bus to at least one random access memory and at least one read only memory device, in a conventional manner. The DSP used in this exemplary embodiment can be, for example, an Analog Devices 2106x digital signal processor chip.

The signal processing module 68 may be implemented in software, hardware or a suitable combination of software and hardware. In addition to one or more DSPs, the signal processing module 68 may include suitable data processing equipment, such as a processor, random access memory, four daughter board module ports, redundant High Level Data Link Controller bus interfaces, pulse code modulation matrix bus interfaces and other signal processing application hardware.

In operation, a subscriber unit 22 may attempt to place a call using the exemplary wireless telecommunications system 14 by the following procedures. Signaling data and other call control data is received from the BTS 20 in an E1 data format at the interface module 62. That data is then switched through the switching module 64 to the telephony support module 66, which performs call setup functions. The call processor 40 receives the signaling data, and determines the call destination. Depending upon the call destination, the call processor 40 sends signaling and call control data to the PSTN 18, another telecommunications system, or a BTS 20 serviced by the integrated wireless telecommunications system 14. If a telecommunications channel cannot be established, a busy signal, a no answer message, or another appropriate response is generated by the telephony support module 66, and the call attempt is terminated. If a telecommunications channel can be established, the call processor 40 configures the switching module 64, the telephony support module 66, the interface module 62, and the signal processing module 68 to process the call data. A similar process is also used to handle incoming telecommunications channels from, for example, PSTN 18 or other telecommunications switches, or to de-allocate elements of the integrated wireless telecommunications system 14 after a call is completed.

The call processor 54, the resource assembly 60 and the NMS-S 70 may communicate with one another through the hub 92. Preferably, the hub 92 is provided as an Ethernet hub so that information may be exchanged between the various elements and objects as needed. The NMS-S 70 and the NMS-C 90 preferably communicate with one another through a hub, not expressly shown in FIG. 2, such as an Ethernet hub, using CORBA. However, the NMS-C 90 may be located locally or remotely with respect to the NMS-S 70. When located remotely, a modem or other communication device may be employed to allow communication between the NMS-S 70 and the NMS-C 90. It should also be noted that more than one NMS-C 90 may access and communicate with the NMS-S 70, and, in other embodiments, the NMS-C 90 may access and communicate with more than one NMS-S 70.

Once again, while the exemplary integrated wireless telecommunications system 14 of FIG. 2 was designed as a GSM system, it should be appreciated and understood that the present invention should not be construed to be so limited. Rather, the present invention is equally applicable to use with technologies and applications other than GSM, including, among others, PCS, CDMA and TDMA technologies.

FIG. 3 is a block diagram illustrating an exemplary embodiment of the merged operations and maintenane center 200 that includes the NMS-S 70 interfaced with the NMS-C 90 and the call processor 40. The call processor 40 is also shown in communication with the resource assembly 60. The NMS-S 70, the NMS-C 90 and the call processor 40 all include various software objects and software applications that each include one or more software objects. In an exemplary embodiment, the NMS-S 70, the NMS-C 90 and the call processor 40 are each implemented using a dedicated processor, such as, for example, an Intel Pentium microprocessor, random-access memory and a hard disk drive. It should also be noted that the architecture and design of the present invention provides the significant advantage of allowing the NMS-S 70, the NMS-C 90 and the call processor 40 to reside on the same computer or processor during software development and testing. This is possible because of the distributed architecture that provides standard object-oriented interfaces between external applications and platforms to provide interoperability of object-oriented software systems. This allows for software testing and development to be easily and quickly performed which further decreases overall system costs.

The software architecture of the exemplary integrated wireless telecommunications system 14 is preferably based on object oriented software engineering technology, and the use of managed objects provided within the NMS-C 90 and the NMS-S 70 as illustrated in FIG. 3. Software objects are used to model and support the various functional, hardware, and interface components and sub-components associated with the integrated wireless telecommunications system 14. Such software may also model the functional procedures performed by physical components. Managed objects such as, for example, subscribers and trunk groups may be created, modified and deleted by an operator.

The NMS-S 70 includes a variety of software objects that may be logically grouped by function and are referred to as servers. Generally, the NMS-C 90 provides corresponding software objects that may provide a GUI interface to an operator and are referred to as clients. The corresponding software clients of the NMS-C 90 allow an operator to retrieve and display information from the corresponding servers of the NMS-S 70 and, in some cases, allow an operator to control these corresponding servers. The NMS-C 90 may be implemented as an NT workstation with the various clients being, preferably, JAVA compatible. These software objects or clients may be developed, for example, using SUN JAVA DEVELOPMENT KIT (JDK) or preferably, using an Integrated Development Environment (IDE) such as SYMANTEC VISUAL CAFE. The GUI interface allows non-technical personnel to operate the integrated wireless telecommunications system 14 and significantly reduces operator training time.

The various software servers of the NMS-S 70 may be grouped into the functional areas described above in detail in connection with FIG. 2. These functional areas, in a preferred embodiment, may include configuration management, fault management, performance management, accounting management, security management and system management. All of these functional areas correspond to a software client of the NMS-C 90. The security management server 80 is preferably responsible for validating operator log-in information and restricting access to certain operations based on the operator's access class. This functionality may be provided by the operating system software of the NMS-S 70.

The functional areas of the NMS-S 70, as previously discussed in connection with FIG. 2, may be referred to as elements or servers, while the corresponding software objects of the NMS-C 90 may be referred to as clients or monitors. The following servers have corresponding clients of the NMS-C 90: the configuration management server 72, the fault management server 74, the performance management server 76, accounting management server 78 and the system management server 82 The configuration management server 72 includes an HLR/AuC server 128, a VLR server 130, a MAPP server 132, a signaling server 134 (such as an SS7 server), an MSC server 136, a resource manager server 138 and a BSC server 140. The corresponding clients of the NMS-C 90 include an HLR/AuC client 108, a VLR client 110, a MAPP client 112, a signaling client 114 (such as an SS7 object), an MSC client 116, a resource manager client 118 and a BSC client 120. As mentioned previously, all of the clients of the NMS-C 90 generally provide GUI interfaces for an operator to monitor and configure the corresponding object in the NMS-S 70. Each of the servers of the NMS-S 70 corresponds with the associated application or object provided in the call processing application 54, the signaling application 56, the system controller application 94 and the resource manager application 58 as illustrated. The function of all of these applications and objects of the call processor 40 is provided above in connection with FIGS. 1 and 2.

With respect to the configuration management server 72, an operator can make changes to reflect the addition or removal of hardware components or modifications to their operational parameters, changes to reflect the addition or removal of subscribers and to subscriber service profiles, and modify translation tables of the MSC 48. Changes made by an operator are sent from the client of the NMS-C 90 to the corresponding server of the NMS-S 70 which, in turn, validates the operator request, updates a local data base, notifies all peer elements of the call processing application 54 of those changes, and reports the completion status of the change request to the operator.

The system management server 82, in the exemplary embodiment of FIG. 3, is provided as its own server that corresponds with the system monitor client 106 of the NMS-C 90 and the system controller application 94 of the call processor 40. This allows an operator to access and display information generated by the system controller application 94. The system management server 82 also supports the start-up and recovery functions of the entire system. Preferably, it is responsible for the sequential, automatic start-up of other servers of the NMS-S 70 by reading system start-up data and periodically polling such elements to verify their operational status and automatically restarting failed elements. The system management server 82 periodically requests that functional elements of the integrated wireless telecommunications system 14 update their stored configuration files to support system recovery. This ensures the availability of start-up files that will allow the system processors to restart at a known configuration state following a shutdown or reset. The system monitor client 106 of the NMS-C 90 provides an operator with a list of the system elements or components residing in the integrated wireless telecommunications system 14, and their status. The operator is also provided with the ability to start, stop or query the status of individual elements and servers.

The accounting management 78 and a corresponding accounting monitor server 104 provide billing records, in the form of call data records, that are reported from the accounting management 78 to an Event Filtering and Routing (EFR) server 124, which, in turn, stores the records on a database associated with the NMS-S 70. The performance management server 76 polls the call processing application 54 for function-specific performance measurements, and generates reports based on those measurements. A corresponding performance monitor client 102 provides an interface for the operator for these functions of the performance management 76.

The fault management server 74 is concerned with alarms and fault-related events. These are routed to the NMS-C 90 for display from the EFR server 124 and the log server 126 through the fault management server 122. A fault monitor client 100 may be used at the NMS-C 90 to access and view this information. The NMS-C 90 provides a filtering and reporting mechanism through the fault monitor client 100 that allows an operator to tailor alarm, event, and state change reporting to meet specific needs. The fault monitor client 100 may include a browser interface that allows one or more operators to access current alarm, event, alarm and state change information. The fault monitor client 100 interfaces with a fault management server 122 of the NMS-S 70 and provides a consistent view of network alarm conditions. The fault management server 122 may also be referred to as a fault monitor server. Real-time notifications are forwarded to the fault monitor client 100 through the fault management server 122 from the EFR server 124. An operator has the ability to filter these notifications (messages) based on their type and severity level.

The EFR server 124 provides common services and routing that support the various servers of the NMS-S 70. The EFR server 124 receives real-time event notifications, such as alarms, test results and billing records, generated by the call processor 40, the resource assembly 60 and other elements of the NMS-S 70. The EFR server 124 is operable to filter them, and then route them to desired destinations within the integrated wireless telecommunications system 14.

The log server 126 is responsible for logging functions. As such, it receives various alarm, event, and state change notifications from the EFR server 124 and stores the information to a database that may be accessed by the NMS-C 90. The log server 126 may also receive and store billing records as files that are accessible through the accounting monitor client 104 and the accounting management server 78. Although the log server 126 and the EFR server 124 are provided in FIG. 3 as part of the fault management server 74, it should be understood that the log server 126 and the EFR server 124 may be provided or grouped with or separate from the fault management server 74 and the fault management server 122.

Thus, it is apparent that there has been provided, in accordance with the present invention, a network management system server and method for operation that satisfies the advantages set forth above. Although the present invention has been described in detail, it should be understood that various changes, substitutions and alterations can be made herein without departing from the scope of the present invention. For example, the various servers of the NMS-S 70 and their interaction with the call processor 40 described herein are dictated somewhat by the GSM implementation described herein. Because the present invention is not so limited, it should be understood that the internal arrangement and interaction of the servers of the NMS-S 70 could be provided in many alternative arrangements without departing from the present invention. As another example, the direct connections or communications illustrated herein could be altered by one skilled in the art such that two components or sub-systems are merely coupled to one another through an intermediate component or components without being directly connected while still achieving the desired results demonstrated by the present invention. Furthermore, although the present invention has been primarily illustrated and described with respect to a GSM wireless telecommunications network, it should be understood that the present invention is no way limited to a GSM wireless telecommunications network. In fact, the present invention could be used with virtually any telecommunications network, whether currently in existence or developed in the future, operating at virtually any frequency and using virtually any technology. Other examples of changes, substitutions, and alterations are readily ascertainable by one skilled in the art and could be made without departing from the spirit and scope of the present invention as defined by the following claims.

What is claimed is:

1. A merged operations and maintenance center in communication with a call processor of a telecommunications system, the merged operations and maintenance center comprising:

a configuration management server operable to perform configuration management for radio and switch functions of the telecommunications system;

a fault management server operable to perform fault management for radio and switching functions of the telecommunications system;

an accounting management server operable to perform accounting management;

a database server operable to store event information; and a user interface operable to access the servers.

2. The merged operations and maintenance center of claim 1, wherein the telecommunications system is a wireless telecommunications system.

3. The merged operations and maintenance center of claim 2, wherein the wireless telecommunications system is an integrated wireless telecommunications system.

4. The merged operations and maintenance center of claim 3, wherein the integrated wireless telecommunications system is a Global System for Mobile Communications system.

5. The merged operations and maintenance center of claim 1, wherein the servers are implemented on a first processor and the graphical user interface is implemented on a second processor.

6. The merged operations and maintenance center of claim 1, wherein the servers and the graphical user interface are implemented on a first processor.

7. The merged operations and maintenance center of claim 1, wherein the servers interface with the call processor.

8. The merged operations and maintenance center of claim 3, wherein integrated wireless telecommunications system uses a technology from a group that includes a code division multiple access technology, a time division multiple access technology, a frequency division multiple access technology and a personal communications services technology.

9. The merged operations and maintenance center of claim 1, further comprising:

an event filtering and routing server operable to receive event information from the call processor and to route the event information to one or more of the servers.

10. The merged operations and maintenance center of claim 1, further comprising:

a performance management server operable to perform performance management.

11. The merged operations and maintenance center of claim 1, further comprising:

a system management server operable to perform system management.

12. The merged operations and maintenance center of claim 1, further comprising:

a security management server operable to perform system management.

13. The merged operations and maintenance center of claim 1, wherein the servers are implemented using object oriented technology.

14. The merged operations and maintenance center of claim 1, wherein the user interface is a network management system client.

15. The merged operations and maintenance center of claim 1, wherein the user interface is a graphical user interface.

16. The merged operations and maintenance center of claim 1, wherein the configuration management server includes one or more servers operable to perform configuration management for a corresponding software object of an application of the call processor.

17. The merged operations and maintenance center of claim 16, wherein the configuration management server includes a home location register server that includes a server subscription database and is operable to provide subscription management using the server subscription database.

18. The merged operations and maintenance center of claim 1, wherein the servers communicate with the call processor using an object request broker.

19. A merged operations and maintenance center in communication with a call processor of a wireless telecommunications system, the merged operations and maintenance center comprising:

a configuration management server operable to perform configuration management for radio and switch functions of the telecommunications system;

a fault management server operable to perform fault management for radio and switching functions of the telecommunications system;

an accounting management server operable to perform accounting management;

a performance management server operable to perform performance management;

a security management server operable to perform system management;

a system management server operable to perform system management;

an event filtering and routing server operable to receive event information and to route the event information to one or more of the servers; and a database server operable to store event information; and a user interface operable to access the servers.

20. The merged operations and maintenance center of claim 19, wherein the wireless telecommunications system is an integrated wireless telecommunications system.

21. The network management system server of claim 20, wherein the integrated wireless telecommunications system is a Global System for Mobile Communications system.

22. The merged operations and maintenance center of claim 19, wherein the servers are implemented as a network management system server and the user interface is implemented as a network management system client.

23. A method for operation of a merged operations and maintenance center comprising the steps of:

performing configuration management using a configuration management server;

performing fault management using a fault management server;

performing accounting management using an accounting management server;

storing and retrieving information using a database server; and monitoring and accessing the servers using a graphical user interface.

24. The method of claim 23, further comprising the step of:

performing performance management using a performance management server.

25. The method of claim 23, further comprising the step of:

performing system management using a system management server.

* * * * *